(12) United States Patent
Kim et al.

(10) Patent No.: US 8,905,122 B2
(45) Date of Patent: Dec. 9, 2014

(54) HEAT EXCHANGER FOR LPI VEHICLE

(75) Inventors: Myeong Hwan Kim, Hwaseong-si (KR); Jae Yeon Kim, Hwaseong-si (KR); Jungha Park, Gunpo-si (KR); Yong Lee, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 180 days.

(21) Appl. No.: 13/528,491

(22) Filed: Jun. 20, 2012

(65) Prior Publication Data

US 2013/0133855 A1 May 30, 2013

(30) Foreign Application Priority Data

Nov. 24, 2011 (KR) .................... 10-2011-0123790

(51) Int. Cl.
| F28D 7/10 | (2006.01) |
| F28D 7/00 | (2006.01) |
| F28F 1/00 | (2006.01) |
| F28F 1/40 | (2006.01) |

(52) U.S. Cl.
CPC . *F28D 7/10* (2013.01); *F28F 1/003* (2013.01); *F28D 7/103* (2013.01); *F28F 1/40* (2013.01)
USPC ......................................... 165/154; 165/141

(58) Field of Classification Search
CPC ....... F02M 31/20; F02M 53/00; F02M 37/20; Y02T 10/126; F02D 19/0647; F25B 40/00; F25B 2400/051; F25B 43/006; F25B 41/067; F28D 7/106; F28D 7/103; F28D 9/0093; F28D 7/14; F28D 9/005; F28F 9/0246
USPC ............. 165/154–163, 81, 82, 177–179, 151, 165/101, 103, 181
See application file for complete search history.

(56) References Cited

U.S. PATENT DOCUMENTS

| 2,778,610 A * | 1/1957 | Bruegger ..................... 126/109 |
| 4,790,145 A * | 12/1988 | Thompson et al. ............. 62/212 |
| 5,509,462 A | 4/1996 | Demko et al. |
| 2003/0196781 A1* | 10/2003 | Wanni et al. .................... 165/82 |
| 2012/0205082 A1* | 8/2012 | Montestruc, III ............. 165/154 |

FOREIGN PATENT DOCUMENTS

| JP | 2010-196534 A | 9/2010 |
| KR | 10-1998-0083369 A | 12/1998 |
| KR | 20-0288633 Y1 | 9/2002 |

\* cited by examiner

Primary Examiner — John F Pettitt
Assistant Examiner — Ignacio E Landeros
(74) Attorney, Agent, or Firm — Morgan, Lewis & Bockius LLP

(57) ABSTRACT

The heat exchanger may include a pipe unit mounted on a refrigerant line connecting a compressor with an evaporator of an air conditioning and adapted to flow a refrigerant and a LPG fuel returned from the engine, a first connecting member mounted at an end of the pipe unit to connect the pipe unit with the refrigerant line where the refrigerant line is connected to the compressor, and a second connecting member mounted at the other end of the pipe unit to connect the pipe unit with the refrigerant line where the refrigerant line is connected to the evaporator. The heat exchanger is configured so that the high-temperature LPG fuel is capable of exchanging heat with the refrigerant.

12 Claims, 7 Drawing Sheets

HEAT EXCHANGER FOR LPI VEHICLE

CROSS-REFERENCE TO RELATED APPLICATION

The present application claims priority of Korean Patent Application Number No. 10-2011-0123790 filed Nov. 24, 2011, the entire contents of which application is incorporated herein for all purposes by this reference.

BACKGROUND OF INVENTION

1. Field of Invention

The present invention relates to a heat exchanger for an LPI (Liquefied Petroleum Injection) vehicle. More particularly, the present invention relates to a heat exchanger for an LPI vehicle that is mounted on a refrigerant line of an air conditioning and adapted for LPG (Liquefied Petroleum Gasoline) fuel to exchange heat with refrigerant circulating through the air conditioning.

2. Description of Related Art

Generally, an LPI (Liquefied Petroleum Injection: an apparatus for injecting LPG fuel in a liquid state) engine, different from mechanical injection type of LPG fuel depending on a pressure of a bombe, is provided with a fuel pump mounted in the bombe. The LPG fuel is pressurized to a high pressure (5 to 15 bar) and is liquefied by the fuel pump. The liquefied fuel is injected to a cylinder by using an injector so as to drive the engine.

Since the LPI engine is adapted to inject liquefied fuel, components such as a vaporizer and a mixer are not necessary. Instead, a high-pressure injector, a fuel pump mounted in the bombe, a fuel supply line, electric control apparatus (ECU) for the LPI engine, and a regulator unit for controlling fuel pressure are additionally necessary The electric control apparatus of the LPI engine receives input signals from various sensors so as to determine a condition of the engine, and controls the fuel pump, the injector, and an ignition coil so as to achieve optimal air/fuel ratio and to improve engine performance.

In addition, the electric control apparatus controls the fuel pump according to fuel amount demanded by the engine so as to supply the liquefied fuel to the engine, and the LPI injector sequentially injects the fuel into the cylinders so as to achieve the optimal air/fuel ratio.

Since high-temperature fuel returned from the engine is returned to the bombe according to a vehicle to which a conventional LPI system is applied, a temperature of the LPG fuel in the bombe is raised and accordingly an internal pressure of the bombe is also increased. Particularly, in a case that the internal pressure of the bombe is higher than a charging pressure of an LPG station, LPG fuel cannot be charged in the bombe.

Since an additional fuel cooling apparatus should be mounted on a return line so as to lower a temperature of the fuel returned from the engine, manufacturing and installing cost may increase and the LPI engine may be hard to be installed in a small engine compartment.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present application are made to provide a heat exchanger for an LPI vehicle having advantages of flowing an LPG fuel into a bombe after a temperature thereof is lowered and advantages of preventing an internal pressure of the bombe from increasing by mounting the heat exchanger on a refrigerant line of an air conditioning and causing the LPG fuel returned to the bombe to exchange heat with a refrigerant circulating through the air conditioning.

A heat exchanger for an LPI vehicle according to various aspects of the present application is adapted to cool high-temperature LPG fuel returned from an engine in the LPI vehicle using the LPG fuel.

The heat exchanger may include a pipe unit, a first connecting member and a second connecting member. The pipe unit is mounted on a refrigerant line that connects a compressor with an evaporator of an air conditioning and adapted to flow a refrigerant and the high-temperature LPG fuel returned from the engine, wherein the refrigerant flows substantially in a center portion of the pipe unit and the high-temperature LPG fuel flows substantially in an outer portion that is outside of the center portion of the pipe unit so that the high-temperature LPG fuel is capable of exchanging heat with the refrigerant. The first connecting member is mounted at an end of the pipe unit to connect the pipe unit with the refrigerant line where the refrigerant line is connected to the compressor, wherein the first connecting member includes an inflow port into which the LPG fuel flows. The second connecting member is mounted at the other end of the pipe unit to connect the pipe unit with the refrigerant line where the refrigerant line is connected to the evaporator, wherein the second connecting member includes an exhaust port from which the LPG fuel passing the pipe unit is exhausted.

The pipe unit may be formed with a triple pipe structure, the refrigerant may flow in a first pipe formed substantially at the center portion of the pipe unit, and the LPG fuel may be distributed to and flows in two pipes that surround the first pipe.

The pipe unit may include a refrigerant pipe providing a refrigerant passage in which the low-temperature and low-pressure gaseous refrigerant supplied from the evaporator through the refrigerant line flows, wherein the refrigerant pipe is disposed substantially at the center portion of the pipe unit; a fuel pipe providing a fuel passage formed between the refrigerant pipe and the fuel pipe and in which the LPG fuel flows, wherein the fuel pipe surrounds the refrigerant pipe; and a bypass pipe providing a bypass passage for detouring the LPG fuel, wherein the bypass pipe surrounds the fuel pipe and the bypass passage is formed between the fuel pipe and the bypass pipe.

The pipe unit may further include at least one partition formed between the refrigerant pipe and the bypass pipe in a length direction, wherein the at least one partition fixes the fuel pipe and the bypass pipe to the refrigerant pipe, and divides the fuel passage and the bypass passage into a plurality of sections.

The first connecting member may include: a first inner pipe having an end connected to the refrigerant line and the other end connected to an end of the refrigerant pipe; and a first outer pipe having the inflow port formed at an exterior circumference thereof, an end integrally formed with the end of the first inner pipe, and the other end enclosing and mounted on an exterior circumference of an end of the bypass pipe.

The second connecting member may include: a second inner pipe having an end connected to the refrigerant line and the other end connected to the other end of the refrigerant pipe; and a second outer pipe having the exhaust port formed at an exterior circumference thereof, an end integrally formed with the end of the second inner pipe, and the other end enclosing and mounted on an exterior circumference of the other end of the bypass pipe.

The LPG fuel and the refrigerant may flow in opposite directions.

Various aspects of the present invention provide for a partition including a first partition connecting the refrigerant pipe with the fuel pipe; and a second partition connecting the fuel pipe and the bypass pipe.

The first partition and the second partition may be disposed on the same axis with respect to the center of the refrigerant pipe.

The refrigerant pipe, the fuel pipe, and the bypass pipe may be integrally formed through extrusion.

The refrigerant pipe and the fuel pipe may be integrally formed through extrusion, and then be inserted into the bypass pipe.

The partition may include: a first partition connecting the refrigerant pipe with the fuel pipe; and a second partition protruded from the fuel pipe in a radially outward direction.

An insert groove corresponding to the second partition may be formed at an interior circumference of the bypass pipe, and the second partition may be inserted in the insert groove.

The methods and apparatuses of the present application have other features and advantages which will be apparent from or are set forth in more detail in the accompanying drawings, which are incorporated herein, and the following Detailed Description, which together serve to explain certain principles of the present application.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
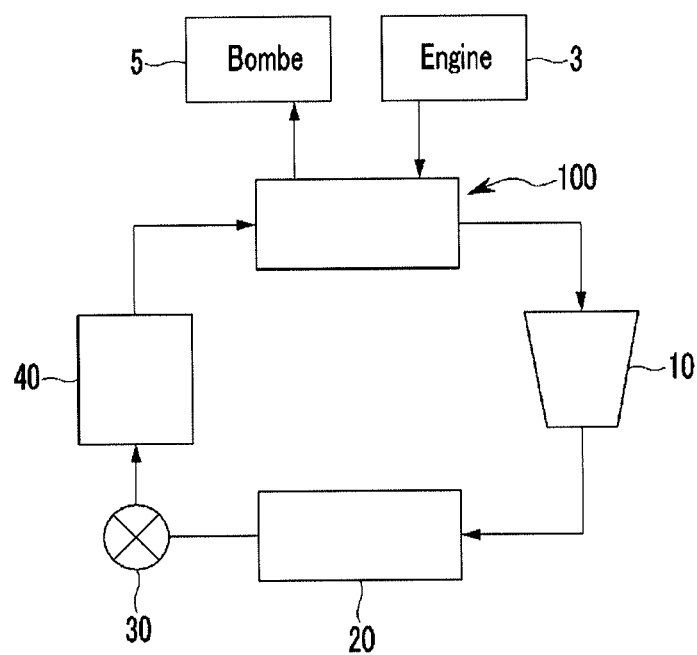
FIG. 1 is a schematic diagram of an exemplary air conditioning to which a heat exchanger for an LPI vehicle according to the present application is applied.
Figure 2:
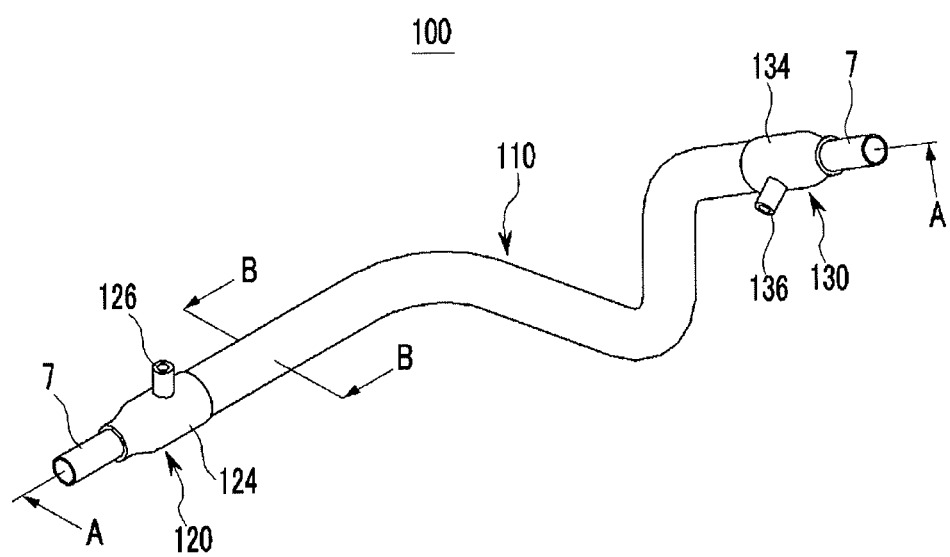
FIG. 2 is a perspective view of an exemplary heat exchanger for an LPI vehicle according to the present application.
Figure 3:
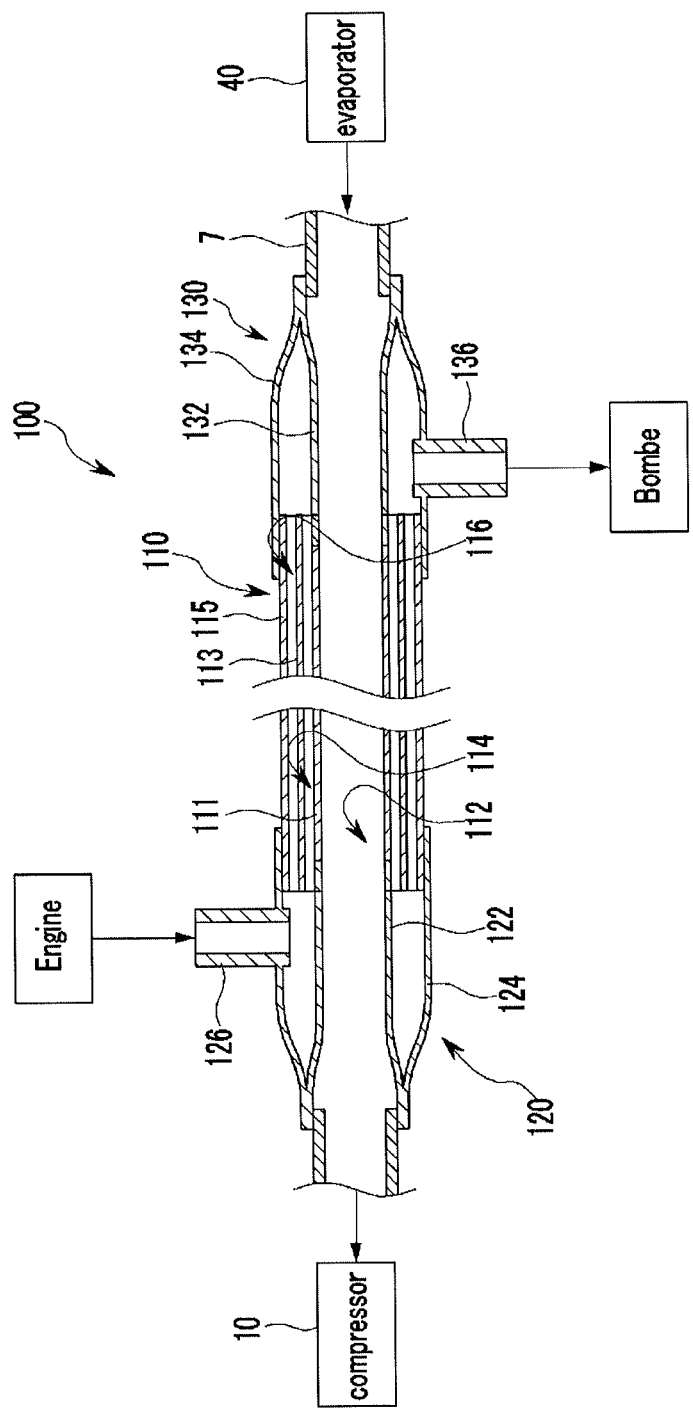
FIG. 3 is a cross-sectional view taken along the line A-A in FIG. 2.
Figure 4:
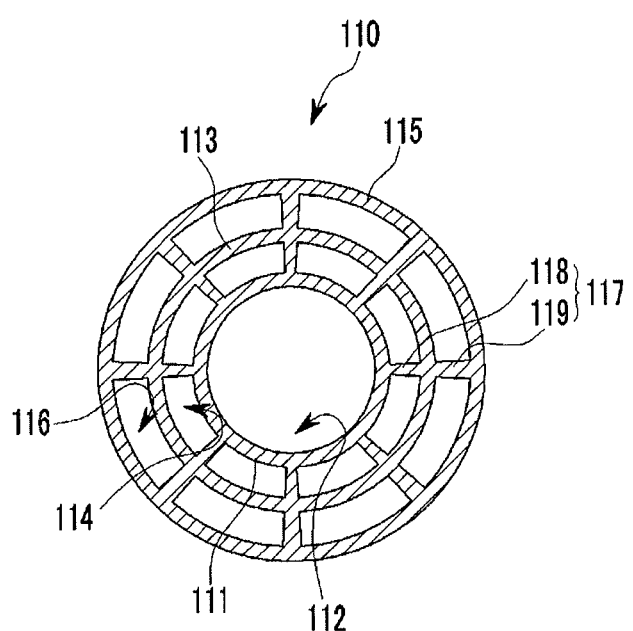
FIG. 4 is a cross-sectional view taken along the lien B-B in FIG. 2.
Figure 5:
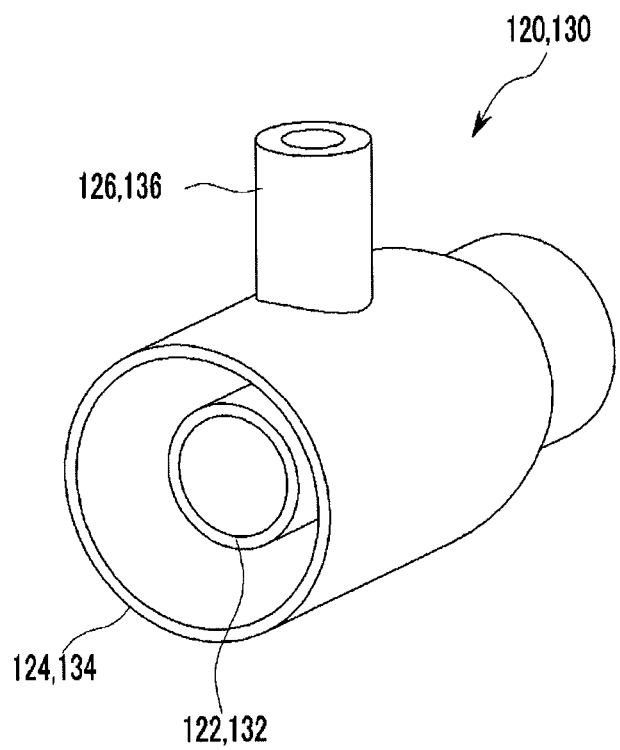
FIG. 5 is a perspective view of an exemplary connecting member applied to a heat exchanger for an LPI vehicle according to the present application.

FIG. 1 is a schematic diagram of an air conditioning to which a heat exchanger for an LPI vehicle according to various embodiments of the present applicant is applied; FIG. 2 is a perspective view of a heat exchanger for an LPI vehicle according to various embodiments of the present applicant; FIG. 3 is a cross-sectional view taken along the line A-A in FIG. 2; FIG. 4 is a cross-sectional view taken along the lien B-B in FIG. 2; FIG. 5 is a perspective view of a connecting member applied to a heat exchanger for an LPI vehicle according to various embodiments of the present applicant.

Referring to the drawings, a heat exchanger 100 for an LPI vehicle according to various embodiments of the present applicant is mounted on a refrigerant line 7 of an air conditioning and is adapted to cause a refrigerant circulating through the air conditioning and an LPG fuel returned to a bombe 5 to exchange heat with each other such that the LPG fuel, after a temperature thereof being lowered, is flowed into the bombe. Therefore, the heat exchanger 100 is adapted to prevent an internal pressure of the bombe from increasing.

Herein, the heat exchanger 100 for the LPI vehicle according to various embodiments of the present applicant, as shown in FIG. 1, is used for the air conditioning including a compressor 10 for compressing the refrigerant, a condenser 20 for receiving the compressed refrigerant from the compressor 10 and condensing the refrigerant, an expansion valve 30 for expanding the liquid refrigerant condensed by the condenser 20, and an evaporator 40 for evaporating the refrigerant expanded by the expansion valve 30 through heat-exchange with air.

Herein, the heat exchanger 100 is mounted on the refrigerant line 7 connecting the compressor 10 with the evaporator 40 and is adapted to cool the high-temperature LPG fuel returned from the engine 3 in the LPI vehicle using the LPG fuel through heat-exchange with the refrigerant.

For this purpose, the heat exchanger 100 for an LPI vehicle according to various embodiments of the present applicant, as shown in FIG. 2 and FIG. 3, includes a pipe unit 110 and first and second connecting members 120 and 130.

The pipe unit 110 is mounted on the refrigerant line 7 connecting the compressor 10 with the evaporator 40 and has a triple pipe structure.

The refrigerant flows substantially in a center portion of the pipe unit 110, the high-temperature LPG fuel returned from the engine 3 flows substantially in a portion outside of the refrigerant and exchanges heat with the refrigerant in a state of not being mixed with the refrigerant, and the LPG fuel detours at an outer of the high-temperature LPG fuel.

Herein, the pipe unit 110, as shown in FIG. 3 and FIG. 4, includes a refrigerant pipe 111, a fuel pipe 113, a bypass pipe 115 and a partition 117, and each constitute element will be described in detail.

The refrigerant pipe 111 is provided with a refrigerant passage 112 formed therein such that the low-temperature and low-pressure gaseous refrigerant supplied from the evaporator 40 through the refrigerant line 7 flows in the refrigerant passage 112, and is disposed essentially at the center portion of the pipe unit 110.

In various embodiments, the fuel pipe 113 surrounds the refrigerant pipe 111, and a fuel passage 114 for flowing the LPG fuel therein is formed between an interior circumference of the fuel pipe 113 and an exterior circumference of the refrigerant pipe 111.

In addition, the bypass pipe 115 is disposed at an outer of the fuel pipe 113, and a bypass passage 116 to which the LPG fuel detours is formed between an interior circumference of the bypass pipe 115 and an exterior circumference of the fuel pipe 113.

Herein, since a portion of the LPG fuel supplied into the pipe unit 110 flows in the bypass passage 116, temperature rise of the refrigerant due to heat of an engine compartment is prevented when the LPG fuel passing through the fuel passage 112 exchanges heat with the refrigerant.

In various embodiments, the partition 117 is disposed between the refrigerant pipe 111 and the bypass pipe 115, and is adapted to fix the fuel pipe 113 and the bypass pipe 115 to the refrigerant pipe 111. At least one partition 117 is formed in a length direction of the pipe unit 110 so as to divide the fuel passage 114 and the bypass passage 116 into a plurality of sections.

Herein, the plurality of partitions 117 is formed apart from each other in a circumferential direction. The partition 117 includes a first partition 118 connecting the refrigerant pipe 111 with the fuel pipe 113 and a second partition 119 connecting the fuel pipe 113 with the bypass pipe 115. The first partition 118 and the second partition 119 may be disposed on the same axis with respect to the refrigerant pipe 111.

In various embodiments, an angle between the neighboring first partitions 118 or the neighboring second partitions 119 may be 45°, and eight first and second partitions 118 and 119 may be formed at the refrigerant pipe 111 along the circumferential direction. The first and second partitions 118 and 119 divide the fuel passage 114 and the bypass passage 116 into the plurality of sections.

Herein, the fuel passage 114 and the bypass passage 116 divided by the first and second partitions 118 and 119 have different cross-sectional areas due to difference of diameters of the pipes 111, 113, and 115. Therefore, flow of the LPG flowing into the fuel the pipe unit 110 is distributed without an additional valve.

That is, when the LPG fuel returned from the engine 3 flows into the fuel passage 114 and the bypass passage 116 divided by the first and second partitions 118 and 119 in the pipe unit 110, a portion of the LPG fuel flows into the fuel passage 114 and the other portion of the LPG fuel flows into the bypass passage 116 having the largest cross-sectional area due to difference between the cross-section areas of the fuel passage 114 and the bypass passage 116.

Therefore, the low-temperature and low-pressure gaseous refrigerant passing through the refrigerant passage 112 and the LPG fuel passing through the fuel passage 114 exchange heat with each other. At this time, the LPG fuel passing through the bypass passage 116 functions as a heat protector that prevents the refrigerant from exchanging heat with the engine compartment.

In addition, when the LPG fuel, the temperature of which is lowered by the refrigerant during passing through the fuel passage 114, is exhausted from the pipe unit 110, the LPG fuel passing through the fuel passage 114 is mixed with the LPG fuel passing through the bypass passage 116. Therefore, the LPG fuel is prevented from being overcooled.

The refrigerant pipe 111, the fuel pipe 113 and the bypass pipe 115 may be integrally and/or monolithically formed through extrusion. The partition 117 may also be integrally and/or monolithically formed through the extrusion.

Meanwhile, it is exemplified in this specification but not limited to eight first and second partitions 118 and 119. The number and positions of the first partition 118 and the second partition 119 may be varied.

In addition, it is exemplified in this specification but not limited to the first and second partitions 118 and 119 that are formed on the same axis. The first and second partitions 118 and 119 may not be formed on the same axis.

In various embodiments, the first connecting member 120 is mounted at an end of the pipe unit 110 and connects the pipe unit 110 with the refrigerant line 7, where the refrigerant line 7 is connected to the compressor 10. An inflow port 126 is formed at a side of the first connecting member 120, and the LPG fuel flows into the inflow port 126.

In addition, the second connecting member 130 is mounted at the other end of the pipe unit 110 and connects the pipe unit 110 with the refrigerant line 7, where the refrigerant line 7 is connected to the evaporator 40 with the pipe unit 110. An exhaust port 136 is formed at a side of the second connecting member 130, and the LPG fuel passing through the pipe unit 110 is exhausted from the exhaust port 136.

Herein, the first connecting member 120, as shown in FIG. 5, includes a first inner pipe 122 and a first outer pipe 124. One end of the first inner pipe 122 is connected to the refrigerant line 7, and the other end of the first inner pipe 122 is connected to one end of the refrigerant pipe 111.

In addition, the inflow port 126 is formed at an exterior circumference of the first outer pipe 124, one end of the first outer pipe 124 is integrally and/or monolithically formed with one end of the first inner pipe 122, and the other end of the first outer pipe 124 encloses and is mounted at an exterior circumference of one end of the bypass pipe 115. A diameter of the other end of the first outer pipe is bigger than that of the first inner pipe 122.

In various embodiments, the second connecting member 130 includes a second inner pipe 132 and a second outer pipe 134. One end of the second inner pipe 132 is connected to the refrigerant line 7, and the other end of the second inner pipe 132 is connected to the other end of the refrigerant pipe 111.

In addition, the exhaust port 136 is formed at an exterior circumference of the second outer pipe 134, one end of the second outer pipe 134 is integrally and/or monolithically formed with one end of the second inner pipe 132, and the other end of the second outer pipe 134 encloses and is mounted at an exterior circumference of the other end of the bypass pipe 115. A diameter of the other end of the second outer pipe is bigger than that of the second inner pipe 132.

The first connecting member 120 is adapted to flow the LPG fuel returned from the engine 3 into the fuel passage 114 and the bypass passage 116 through the inflow port 126.

In addition, the second connecting member 130 is adapted to mix the LPG fuel cooled during passing through the fuel passage 114 of the pipe unit 110 with the LPG fuel passing through the bypass passage 116 in a space formed between the second inner pipe 132 and the second outer pipe 134. After that, the second connecting member 130 is adapted to exhaust the mixed LPG fuel to the bombe 5 through the exhaust port 136.

Hereinafter, operation and function of the heat exchanger 100 for an LPI vehicle according to various embodiments of the present applicant will be described in detail.

Figure 6:
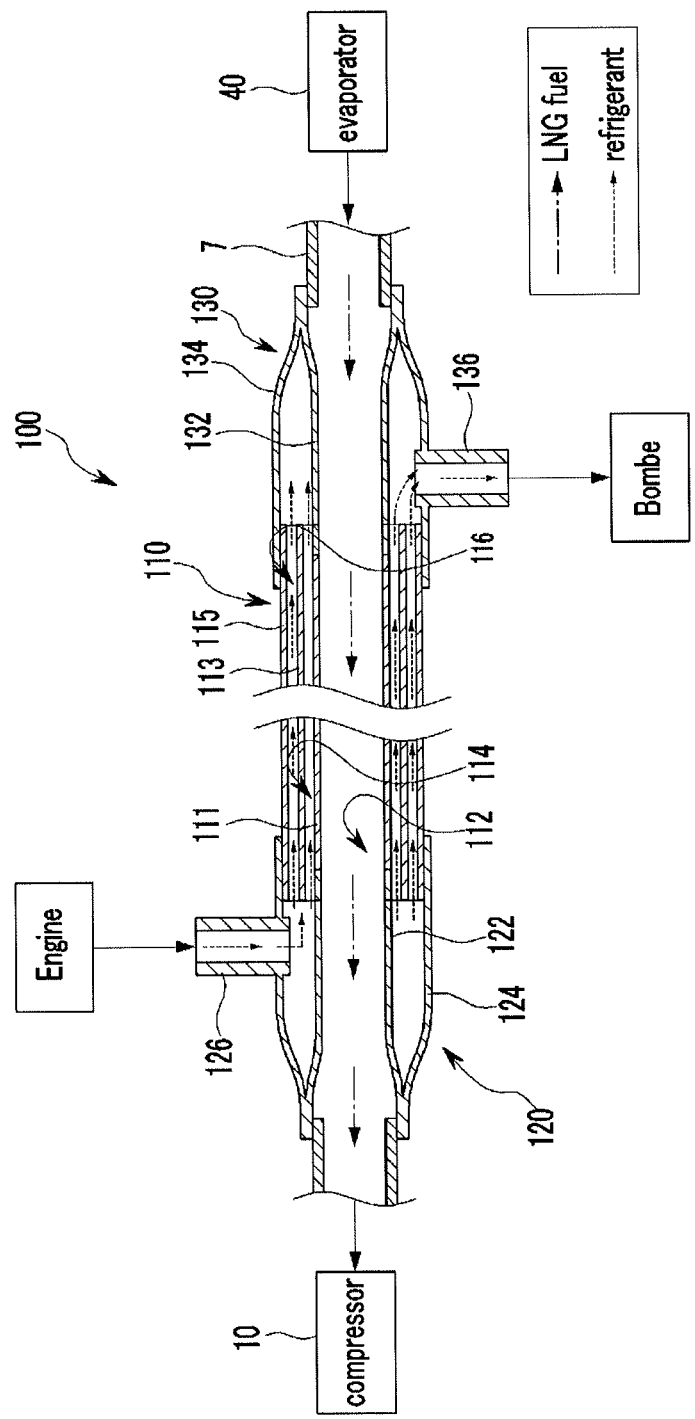
FIG. 6 is a cross-sectional view for showing operation of an exemplary heat exchanger for an LPI vehicle according to the present application.

FIG. 6 is a cross-sectional view for showing operation of a heat exchanger for an LPI vehicle according to various embodiments of the present applicant.

Referring to the drawing, the heat exchanger 100 for an LPI vehicle according to various embodiments of the present applicant flows the LPG fuel returned from the engine 3 into the first connecting member 120 through the inflow port 126. Then, the LPG fuel is distributed to the fuel passage 114 and the bypass passage 116 divided by the first and second partitions 118 and 119. At this time, since a cross-sectional area of the fuel passage 114 is smaller than that of the bypass passage 116, only the portion of the LPG fuel flows into the fuel passage 114 and the other portion of the LPG fuel flows into the bypass passage 116.

The refrigerant is supplied from the evaporator 40 through the refrigerant line 7. The refrigerant flows in the refrigerant passage 112 in a direction that is opposite to the direction of the fuel. In this process, the LPG fuel passing through the fuel passage 114 is cooled by heat-exchange with the refrigerant.

In addition, the LPG fuel passing through the bypass passage 116 prevents heat of the engine compartment from being delivered to the refrigerant. Therefore, the LPG fuel passing through the bypass passage 116 prevents the temperature of the refrigerant from being raised and exchanges heat with the LPG fuel passing through the fuel passage 114.

Therefore, the LPG fuel cooled through heat-exchange flows into a space between the second inner pipe 132 and the second outer pipe 134 of the second connecting member 130, and is mixed with the LPG fuel passing through the bypass passage 116. Thereby, the LPG fuel has a desirable temperature. After that, the LPG fuel is exhausted to the bombe 5 through the exhaust port 136.

Therefore, after the high-temperature LPG fuel returned from the engine 3 is cooled through heat-exchange with the refrigerant, the LPG fuel is mixed with the bypass LPG fuel so as to have the desirable temperature. After that, the heat exchanger 100 exhausts the LPG fuel to the bombe 5. Therefore, increase of the internal pressure in the bombe 5 due to inflow of the high-temperature LPG fuel is prevented.

Therefore, the heat exchanger 100 for the LPI vehicle according to various embodiments of the present applicant is adapted to flow the LPG fuel into the bombe 5 after the temperature of the LPG fuel is lowered through heat-exchange between the refrigerant circulating through the air conditioning and the LPG fuel returned to the bombe 5. Therefore, increase of the internal pressure in the bombe 5 may be prevented, and supply of the fuel may be smoothly performed and marketability may be improved.

In addition, the refrigerant passage 112, the fuel passage 114 and the bypass passage 116 of the pipe unit 110 are sequentially disposed from an inner side to an outer side, the refrigerant flows in the refrigerant passage 112, and the fuel flows in the fuel passage 114 and the bypass passage 116 according to various embodiments of the present applicant. The refrigerant flowing in the refrigerant line 7 disposed in the engine compartment is prevented from exchanging heat directly with the engine compartment. Therefore, heat loss may be reduced and deterioration of performance of the air conditioning may be minimized.

In addition, after the portion of the fuel passing through the pipe unit 110 exchanges heat with the refrigerant and the other portion of the fuel does not exchange heat with the refrigerant, the portion of the fuel and the other portion of the fuel are mixed and exhausted to the bombe 5. Therefore, the LPG fuel may be cooled to the desirable temperature.

Figure 7:
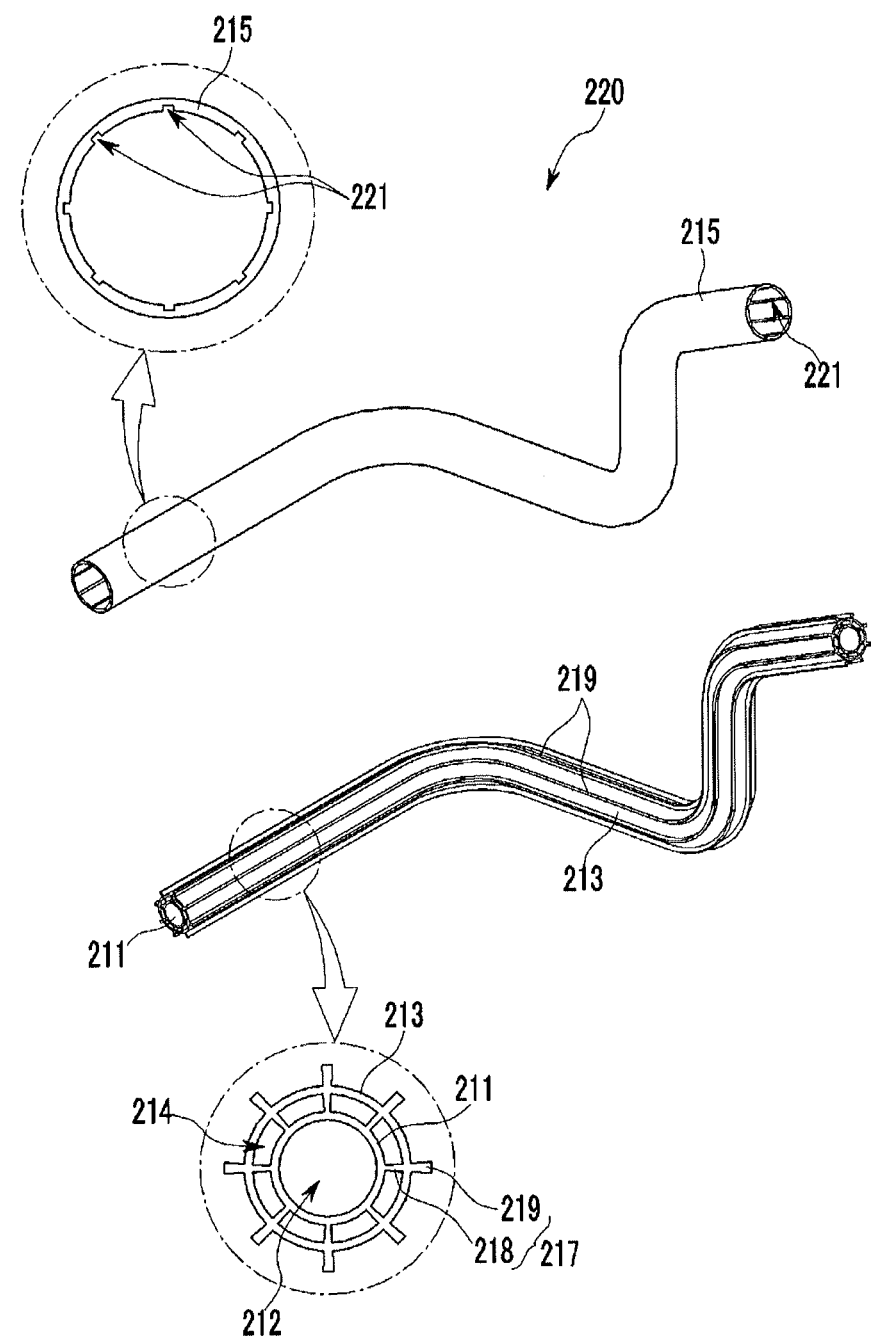
FIG. 7 is an exploded perspective view of an exemplary pipe unit applied to a heat exchanger for an LPI vehicle according to the present application.

FIG. 7 is an exploded perspective view of a pipe unit applied to a heat exchanger for an LPI vehicle according to various embodiments of the present applicant. Referring to the drawing, a heat exchanger 100 for the LPI vehicle according to various embodiments of the present applicant includes the pipe unit 220.

That is, the refrigerant pipe 211 and the fuel pipe 213 according to various embodiments of the present applicant may be integrally and/or monolithically formed through extrusion. The refrigerant pipe 211 and the fuel pipe 213 are inserted in the bypass pipe 215 formed separately.

Herein, the partition 217 includes the first partition 218 connecting the refrigerant pipe 211 with the fuel pipe 113 and the second partition 219 protruded from an exterior circumference of the fuel pipe 213 in a radial outward direction.

In addition, an insert groove 221 corresponding to the second partition 219 is formed at an interior circumference of the bypass pipe 215. The second partition 219 is adapted to be inserted in the insert groove 221.

That is, the refrigerant pipe 211, the fuel pipe 213 and the first and second partitions 218 and 219 are integrally and/or monolithically formed through extrusion, and the second partition 219 is inserted in the insert groove 221 formed at the bypass pipe 215. Therefore, the refrigerant pipe 211 and the fuel pipe 213 are assembled to the bypass pipe 215.

For convenience in explanation and accurate definition in the appended claims, the terms inner or outer, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heat exchanger for an LPI (Liquefied Petroleum Injection) vehicle that is adapted to cool high-temperature LPG (Liquefied Petroleum Gasoline) fuel returned from an engine in the LPI vehicle using the LPG fuel, the heat exchanger comprising:
    a pipe unit mounted on a refrigerant line that connects a compressor with an evaporator of an air conditioner and adapted to flow a refrigerant and the high-temperature LPG fuel returned from the engine, wherein the refrigerant flows substantially in a center portion of the pipe unit and the high-temperature LPG fuel flows substantially in an outer portion that is outside of the center portion of the pipe unit so that the high-temperature LPG fuel is capable of exchanging heat with the refrigerant;
    a first connecting member mounted at an end of the pipe unit to connect the pipe unit with the refrigerant line where the refrigerant line is connected to the compressor, wherein the first connecting member includes an inflow port into which the LPG fuel flows; and
    a second connecting member mounted at the other end of the pipe unit to connect the pipe unit with the refrigerant line where the refrigerant line is connected to the evaporator, wherein the second connecting member includes an exhaust port from which the LPG fuel passing the pipe unit is exhausted;
    wherein the pipe unit comprises:
        a refrigerant pipe providing a refrigerant passage in which the low-temperature and low-pressure gaseous refrigerant supplied from the evaporator through the refrigerant line flows, wherein the refrigerant pipe is disposed substantially at the center portion of the pipe unit;
        a fuel pipe providing a fuel passage formed between the refrigerant pipe and the fuel pipe and in which the LPG fuel flows, wherein the fuel pipe surrounds the refrigerant pipe; and
        a bypass pipe fluidly-bypassing the fuel pipe and providing a bypass passage for detouring the LPG fuel, wherein the bypass pipe surrounds the fuel pipe and the bypass passage is formed between the fuel pipe and the bypass pipe; and wherein the fuel pipe and the bypass pipe are formed in an entire length between the inflow port and the exhaust port.

2. The heat exchanger of claim 1, wherein the pipe unit is formed with a triple pipe structure, the refrigerant flows in a first pipe formed substantially at the center portion of the pipe unit, and the LPG fuel is distributed to and flows in two pipes that surround the first pipe.

3. The heat exchanger of claim 1, wherein the pipe unit further comprises at least one partition formed between the refrigerant pipe and the bypass pipe in a length direction, wherein the at least one partition fixes the fuel pipe and the bypass pipe to the refrigerant pipe, and divides the fuel passage and the bypass passage into a plurality of sections.

4. The heat exchanger of claim 3, wherein the partition comprises:

a first partition connecting the refrigerant pipe with the fuel pipe; and a second partition connecting the fuel pipe and the bypass pipe.

5. The heat exchanger of claim 4, wherein the first partition and the second partition are disposed on the same axis with respect to the center of the refrigerant pipe.

6. The heat exchanger of claim 1, wherein the first connecting member comprises:

a first inner pipe having an end connected to the refrigerant line and the other end connected to an end of the refrigerant pipe; and a first outer pipe having the inflow port formed at an exterior circumference thereof, an end integrally formed with the end of the first inner pipe, and the other end enclosing and mounted on an exterior circumference of an end of the bypass pipe.

7. The heat exchanger of claim 1, wherein the second connecting member comprises:

a second inner pipe having an end connected to the refrigerant line and the other end connected to the other end of the refrigerant pipe; and a second outer pipe having the exhaust port formed at an exterior circumference thereof, an end integrally formed with the end of the second inner pipe, and the other end enclosing and mounted on an exterior circumference of the other end of the bypass pipe.

8. The heat exchanger of claim 1, wherein the LPG fuel and the refrigerant flow in opposite directions.

9. The heat exchanger of claim 1, wherein the refrigerant pipe, the fuel pipe, and the bypass pipe are integrally formed through extrusion.

10. The heat exchanger of claim 1, wherein the refrigerant pipe and the fuel pipe are integrally formed through extrusion, and then are inserted into the bypass pipe.

11. The heat exchanger of claim 10, wherein the partition comprises:

a first partition connecting the refrigerant pipe with the fuel pipe; and a second partition protruded from the fuel pipe in a radially outward direction.

12. The heat exchanger of claim 11, wherein an insert groove corresponding to the second partition is formed at an interior circumference of the bypass pipe, and the second partition is inserted in the insert groove.

* * * * *